Feb. 9, 1954  R. P. EVANS  2,668,533
MEDICAL APPARATUS
Filed Feb. 12, 1952
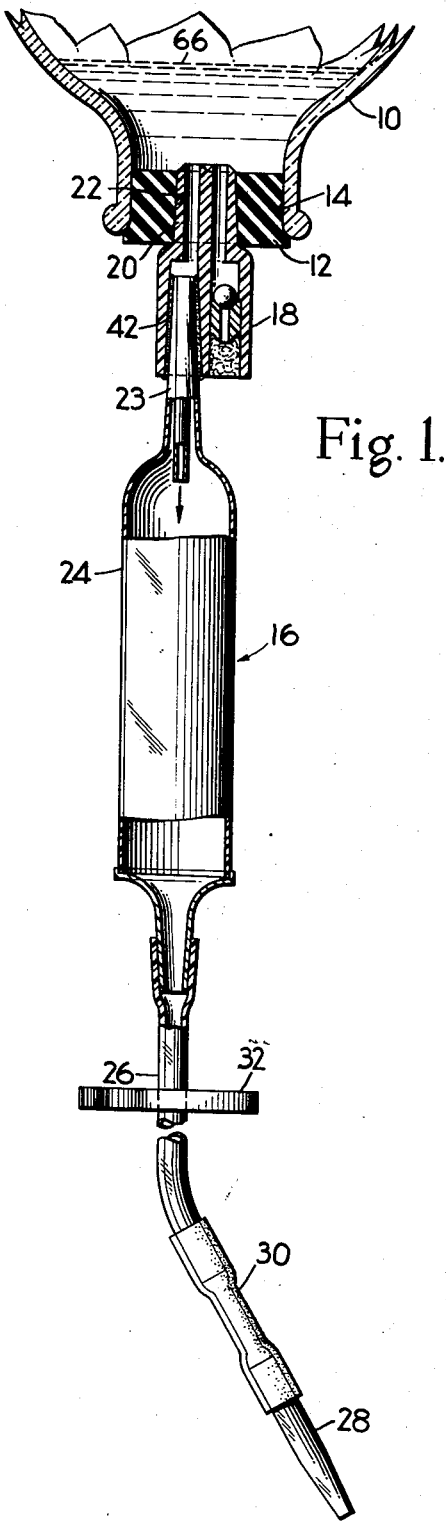
Fig. 1.
Fig. 2.
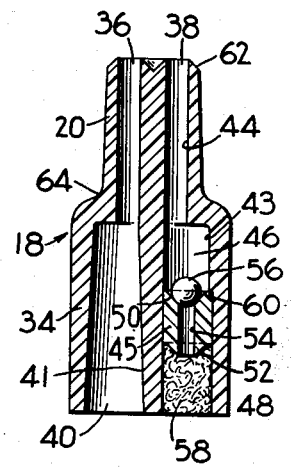
INVENTOR.
ROBERT P. EVANS
BY
Bean, Brooks, Buckley & Bean.
ATTORNEYS Patented Feb. 9, 1954

2,668,533

UNITED STATES PATENT OFFICE 2,668,533

MEDICAL APPARATUS

Robert P. Evans, Kenmore, N. Y., assignor to Sterilon Corporation, Buffalo, N. Y.

Application February 12, 1952, Serial No. 271,170

10 Claims. (Cl. 128—214)

This invention relates to apparatus for administration of medical liquids such as in intravenous injections or the like, and has particular reference to dispensing apparatus for connection with containers of such liquids.

One object of the invention is to provide a dispensing unit of the aforementioned type which is adapted for easy insertion into the hole of the stopper of the liquid container. Another object of the invention is to provide such a dispensing unit which is of simple shape and has few parts so as to facilitate complete sterilizing thereof and to provide for economical manufacture so as to permit one time use. Still another object of the invention is to provide a dispensing apparatus which is adapted to be made from inexpensive disposable plastic material. A further object of the invention is to provide a dispensing device which is fool proof and reliable in operation, and which is entirely transparent so as to permit continuous observation of the flow therewithin. Other objects of the invention will be apparent from the specification and drawing, in which:

Fig. 1 is an illustration partly in section of a dispensing apparatus of the invention shown as applied to a container for the dispensing of medical fluid therefrom; and Fig. 2 is an enlarged detailed illustration of the container outlet member of Fig. 1.

One embodiment of the invention is shown in Fig. 1 as applied to a fluid container or bottle 10 which has a rubber or other resilient one hole stopper 12 frictionally fitted within its neck opening 14. The dispensing fitting or appartus 16 of the invention is shown to comprise an outlet member 18 which has a reduced diameter cylindrical tip portion 20 which fits into and frictionally engages with the hole 22 of the bottle stopper 12. The outlet member 18 connects with the inner end 23 of a drip meter 24 which in turn connects at its outer end to a length of flexible tubing 26. The tube 26 is provided at its outer end with a connector 28 for reception of an administration needle (not shown). Thus the drip meter 24 and tube parts 26, 28 comprise a needle supply conduit member for connecting the outlet member 18 with the administration needle. The tube 26 may be made from rubber or flexible plastic material, and where the latter material is used a short length of translucent rubber tubing 30 is preferably provided as a self-sealing point of access for a second administration apparatus or the like, the rubber tube piece 30 being conveniently disposed as a joint between the tubing 26 and the needle connector 28. In any case, it is preferable that the tubing be of material which is sufficiently transparent to permit observation of the flow therethrough. For this purpose the tube 26 may be made from polyvinyl or polyethylene or the like. Flow from the illustrated bottle 10 is controlled by a clip 32 which is adapted to constrict the tube 26.

Referring to Fig. 2 the outlet member 18 is formed with a cylindrical body portion 34 and the reduced diameter tip portion 20, and is provided with a fluid outlet passageway 36 and an air inlet passageway 38 longitudinally therethrough.

The fluid outlet passageway 36 is formed with an enlarged portion 40 at the outer or body end thereof, and this enlarged portion is formed with an outwardly flaring taper 41 which is adapted to receive the inner end 23 of the drip meter 24. This joint between the drip meter and the outlet member may be secured by the frictional characteristic of the taper, but is preferably "welded" as shown at 42, Fig. 1, so as to prevent disassembly for reasons which will appear hereinafter.

It will be understood that the term "welded" as used in this specification includes a plastic cement joint or similar permanently fused or cemented connection, according to the materials used.

The air inlet passageway 38 is formed with a cylindrical bore 43 in the body portion thereof which connects with a reduced bore 44 extending down through the tip portion 20 of the outlet member. A generally cylindrical plug member 45 is fixed, preferably by means of welding, in the central portion of the cylindrical bore 43 so as to divide the same into a check valve chamber 46 in the inner or upper end thereof and a filter chamber 48 at the outer or lower end. The plug member 45 is formed with a frusto-conical valve seat surface 50 at the upper or inner end and with a frusto-conical projection 52 at the other end thereof. The two conical surfaces of the plug 45 are joined by an axial bore 54 which then completes communication through the air inlet passageway.

A ball check valve member 56 is provided in the check valve chamber 46 and is dimensioned to be contained therein against passage through either the reduced bore 44 or the axial bore 54 so as to cooperate with the valve seat surface or portion 50 to prevent downward or outward passage of fluid through the air inlet passageway 38.

The ball valve member 56 may be fabricated from a glass or suitable plastic material or the like, but is preferably made from stainless steel.

An air filter medium 58 of cotton or the like fills the filter chamber 48 and fits tightly against the conical projection 52 so that dust particles or the like in the air are prevented from entering the bottle 10. The remainder of the outlet member 18 and the drip meter 24 are preferably made of clear, heat resistant polystyrene.

The cylindrical bore 43 is preferably counterbored to provide a radial face portion or land 60 so as to bear against the inner end of the plug 45, whereby the proper location of the plug is positively determined during assembling thereof in the cylindrical bore 43 so as to insure that the valve chamber 46 will be of proper dimension to freely accommodate movement of the ball valve member 56 upwardly to its valve-open position. Additionally the tip portion 20 of the outlet member 18 is tapered toward and chamfered at its end 62 to facilitate insertion thereof into the stopper hole 22, and a rounded fillet or shoulder 64 is provided at the junction at the tip portion 20 and the body portion 34 of the outlet member 18 which seats against the outer periphery of the stopper hole so as to provide a tight seal.

The dispensing fitting 16 of the invention will be supplied as a packaged, sterile unit with the outlet member 18, the drip meter 24, the tubing 26, the joint piece 30 with its flow control clip 32, and the needle connector 28 assembled as shown in Fig. 1. In use, a bottle 10 containing the liquid 66 to be administered and having a one hole rubber stopper 12 covered by a protective outer cap (not shown) will be uncapped and the dispensing fitting 16 of the invention will be inserted into the hole 22 of the bottle stopper 12 as shown. Bottles of medical fluid of the aforementioned type are in common use. The bottle 10 will then be inverted to the position shown in Fig. 1 and elevated above the patient so when the needle connector 28 is fitted with an administration needle and the flow control clip 32 is properly adjusted, gravity flow of the fluid 66 will commence down through the fluid outlet passageway 36 and the drip meter 24 and thence through the tubing 26 and out through the needle. At the same time fluid from the bottle 10 will fill the air inlet passageway 38 above the ball check valve 56, but will be prevented from passage beyond that point by the seating of the ball 56 on the surface 50. When sufficient liquid has drained from the bottle 10 through the outlet passageway 36 a partial vacuum will occur therein which will permit the external atmospheric pressure to act to lift the ball member 56 from its seat so as to permit air to pass upwardly through the filter medium 58 and the axial bore 54 past the ball member 56 and through the reduced bore 44 into the bottle 10. Thus the drainage of the liquid through the outlet passageway 36 will proceed in a regular flow as determined by the adjustment of the clip 32.

After administration of the fluid in the bottle 10 has been completed the dispensing fitting 16 will be removed from the bottle stopper 12 and discarded, and the bottle 10 will be returned to a refilling and sterilizing facility for reuse. It has been determined that it is not economically justifiable to properly re-sterilize a dispensing fitting of the type of the invention for reuse, and in order to discourage attempts at such re-sterilization which may be inadequate, it is preferred that the drip meter 24 be permanently cemented to the outlet member 18 as shown at 42 in Fig. 1 so as to prevent disassembly such as would be undertaken in attempting to clean and re-sterilize the fitting. It is a feature of the invention that the dispensing fitting thereof is adapted to be made at a cost which would permit disposal after single use, the parts being made from inexpensive material and in simple, easily manufactured shapes.

Alternatively, the outlet member 18 of the invention may be supplied separately as shown in Fig. 2 for use with reusable glass drip meters or the like, and for this purpose the fluid outlet passageway 36 is made with the outwardly flaring taper 41 which will fit drip meters in common use. In such case it may be preferable to make the outlet member from a steam sterilizable material such as nylon, Bakelite, or stainless steel, for example.

It will be appreciated that the dispensing apparatus of the invention is of unusual simplicity while retaining full efficiency of operation. In the preferred embodiment, all of the conduit parts thereof including both the outlet member and the drip tube assembly are made from material which is sufficiently transparent to permit constant observation of the cleanliness of the interior passageways and of the proper flow therethrough, as well as of the condition of the air filter and the operation of the check valve. The chamfered and tapered cylindrical tip portion 20 is readily inserted in the single stopper hole 22 whereupon the apparatus is ready for connection to a needle and use. Additionally, the simplicity of design and low cost of materials required permits the important feature of economic disposal of the units after one use, both for the convenience of the operator in using a new packaged unit and for the safety of the patient in assuring perfect sterility.

While only one general example of the invention has been shown and described, it will be appreciated that it may be variously embodied within the scope of the appended claims.

I claim:

1. In an apparatus for intravenous administration of fluids, a dispensing fitting adapted at one end for connection to a stopper of a bottle containing fluid to be administered and adapted for connection to an administration needle at its other end, said fitting comprising an outlet member and a needle supply conduit member including a drip meter, said conduit member being adapted at its outer end for connection to said needle, said outlet member having a cylindrical body portion and a reduced diameter cylindrical tip portion and separate air inlet and fluid outlet passageways passing longitudinally through said outlet member, said tip portion being adapted for insertion into an opening of the bottle stopper, said outlet passageway being outwardly tapered at the body portion end thereof to receive the inner end of said conduit member and being welded thereto, said inlet passageway comprising a cylindrical bore at the body portion end thereof and a reduced bore throughout the remainder thereof, a plug in said cylindrical bore, said plug being formed with a frustro-conical valve seat at the inner end thereof and a frustro-conical projection at the outer end thereof and an axial bore therethrough, said plug being welded in place in said cylindrical bore and dimensioned and located to divide said cylindrical bore into a check valve chamber at the inner end thereof and a filter chamber at the outer end thereof, a shoulder in said cylindrical bore bearing against the inner end of said plug to determine the location thereof, a ball valve member in said valve chamber in said cylindrical bore between said plug and said reduced bore, said ball being of smaller diameter than said cylindrical bore but of larger diameter than said reduced bore and said axial bore, and a fibrous air filter filling said filter chamber.

2. In an apparatus for intravenous administration of fluids, a dispensing fitting adapted at one end for connection to a stopper of a bottle containing fluid to be administered and adapted for connection to an administration needle at its other end, said fitting comprising an outlet member and a needle supply conduit member, said needle supply conduit member including a drip meter at its inner end and being adapted at its outer end for connection to said needle, said outlet member having a cylindrical body portion and a reduced diameter cylindrical tip portion integral therewith and separate air inlet and fluid outlet passageways passing longitudinally through said outlet member, said tip portion being tapered toward its end and chamfered at its end for insertion into an opening of the bottle stopper, a rounded fillet at the junction of said tip portion and said body portion, said outlet passageway being outwardly tapered at the body portion end thereof to receive the inner end of said drip meter and being welded thereto, said inlet passageway comprising a cylindrical bore at the body portion end thereof and a reduced bore throughout the remainder thereof, a plug in said cylindrical bore, said plug being formed with a frustro-conical valve seat at the inner end thereof and a frustro-conical projection at the outer end thereof and an axial bore therethrough, said plug being welded in place in said cylindrical bore and dimensioned and located to divide said cylindrical bore into a check valve chamber at the inner end thereof and a filter chamber at the outer end thereof, said cylindrical bore being counter-bored from its outer end to provide a shoulder in said cylindrical bore bearing against the inner end of said plug to determine the location thereof, a ball valve member in said valve chamber in said cylindrical bore between said plug and said reduced bore, said ball being of smaller diameter than said cylindrical bore but of larger diameter than said reduced bore and said axial bore, and a cotton air filter filling said filter chamber.

3. In an apparatus for intravenous administration of fluids, a dispensing fitting adapted at one end for connection to a stopper of a bottle containing fluid to be administered and adapted for connection to an administration needle at its other end, said fitting comprising an outlet member and a needle supply conduit member comprising a drip meter, said conduit member being adapted at its outer end for connection to said needle, said outlet member having a body portion and a reduced sectioned cylindrical tip portion and separate air inlet and fluid outlet passageways passing longitudinally through said outlet member, said tip portion being adapted for insertion into an opening of the bottle stopper, said outlet passageway being outwardly tapered at the body portion end thereof to receive the inner end of said conduit member, said inlet passageway having a relatively large section outer portion at the body portion end thereof and a reduced section portion throughout the remainder thereof, a plug in said outer portion, said plug being formed with a valve seat at the inner end thereof and with a valve passageway therethrough, said plug being dimensioned and located to divide said outer portion into a check valve chamber at the inner end thereof and a filter chamber at the outer end thereof, a ball valve member in said valve chamber in said outer portion between said plug and said reduced section portion, said ball being dimensioned to be contained in said valve chamber and to close said valve passageway, and an air filter in said filter chamber.

4. In an apparatus for intravenous administration of fluids, a dispensing fitting for connection to a stopper of a bottle containing fluid to be administered at one end and for connection to an administration needle at its other end, said fitting comprising an outlet member and an administration needle supply conduit member, said outlet member having a body portion and a reduced section generally cylindrical tip portion integral therewith and separate air inlet and fluid outlet passageways passing longitudinally through said outlet member, said tip portion being adapted for insertion into an opening of the bottle stopper, said outlet passageway being adapted at the body portion end thereof to make connection to said conduit member, said inlet passageway having a relatively large section outer portion at the body portion end thereof and a reduced section portion throughout the remainder thereof, a plug in said outer portion, said plug being formed with a valve seat at the inner end thereof and with a valve passageway therethrough, said plug being dimensioned and located to divide said outer portion into a check valve chamber at the inner end thereof and a filter chamber at the outer end thereof, a valve closure member in said valve chamber, said valve closure member being dimensioned to be contained in said valve chamber and to close said valve passageway, and an air filter in said filter chamber.

5. In an apparatus for intravenous administration of fluids, a dispensing fitting for connection to a stopper of a bottle containing fluid to be administered at one end and for connection to an administration needle at its other end, said fitting comprising an outlet member and a needle supply conduit member, said conduit member including a drip meter at its inner end and being adapted at its outer end to make connection to the needle, said outlet member having a cylindrical body portion and a reduced diameter cylindrical tip portion integral therewith and separate air inlet and fluid outlet passageways passing longitudinally through said outlet member, said tip portion being adapted for insertion into an opening of the bottle stopper, said outlet passageway being outwardly tapered at the body portion end thereof to receive the inner end of said drip meter and being welded thereto, said inlet passageway comprising a cylindrical bore at the body portion end thereof and a reduced bore throughout the remainder thereof, a plug in said cylindrical bore, said plug being formed with a frusto-conical valve seat at the inner end thereof, and a frusto-conical projection at the outer end thereof and an axial bore therethrough, said plug being welded in place in said cylindrical bore and dimensioned and located to divide said cylindrical bore into a check valve chamber at the inner end thereof and a filter chamber at the outer end thereof, a shoulder in said cylindrical bore bearing against the inner end of said plug to determine the location thereof, a stainless steel ball valve member in said valve chamber in said cylindrical bore between said plug and said reduced bore, said ball being of smaller diameter than said cylindrical bore but of larger diameter than said reduced bore and said axial bore, said drip meter and said outlet member and said plug being of clear polystyrene material, and a cotton air filter filling said filter chamber.

6. In an apparatus for intravenous administration of fluids, a nylon outlet member having a body portion and a reduced section generally cylindrical single tip portion integral therewith and separate air inlet and fluid outlet passageways passing longitudinally through said outlet member, said tip portion being adapted for insertion into a single opening of the stopper of a bottle containing fluid to be administered, said outlet passageway being adapted at the body portion end thereof to make connection to an administration needle supply conduit means, said inlet passageway having a relatively large section outer portion at the body portion end thereof and a reduced section portion throughout the remainder thereof, a nylon plug in said outer portion, said plug being formed with a valve seat at the inner end thereof and with a valve passageway therethrough, said plug being dimensioned and located to divide said outer portion into a check valve chamber at the inner end thereof and a filter chamber at the outer end thereof, a valve closure member in said valve chamber, said valve closure member being dimensioned to be contained in said valve chamber and to close said valve passageway, and an air filter in said filter chamber.

7. In an apparatus for intravenous administration of fluids, an outlet member having a body portion and a reduced section generally cylindrical single tip portion and separate inlet and outlet passageways passing longitudinally through said outlet member, said tip portion being adapted for insertion into a single opening of the stopper of a bottle containing fluid to be administered, said outlet passageway being adapted at the body portion end thereof to make connection to an administration needle supply conduit means, said inlet passageway having a check valve therein adapted to prevent outward flow therethrough.

8. In an apparatus for intravenous administration of fluids, a disposable dispensing fitting adapted at one end for connection to a stopper of a bottle containing fluid to be administered and adapted for connection to an administration needle at its other end, said fitting comprising an outlet member and a needle supply conduit member comprising a drip meter, said conduit member being adapted at its outer end for connection to said needle, said outlet member having a body portion and a reduced section generally cylindrical single tip portion and separate inlet and outlet passageways passing longitudinally through said outlet member, said tip portion being adapted for insertion into a single opening of the stopper, said outlet passageway being welded at the body portion end thereof to the inner end of said conduit member, said inlet passageway having a check valve therein adapted to prevent outward flow therethrough.

9. In an apparatus for intravenous administration of fluids, an outlet member having a generally cylindrical single tip portion and separate inlet and outlet passageways passing longitudinally through said outlet member, said tip portion being adapted for insertion into a single opening of the stopper of a bottle containing fluid to be administered, said outlet passageway being adapted at the outer end thereof to make connection to an administration needle supply conduit means, said inlet passageway having a check valve therein adapted to prevent outward flow therethrough.

10. In an apparatus for intravenous administration of fluids, a disposable dispensing fitting adapted at one end for connection to a stopper of a bottle containing fluid to be administered and adapted for connection to an administration needle at its other end, said fitting comprising an outlet member and a needle supply conduit member comprising a drip meter, said conduit member being adapted at its outer end for connection to said needle, said outlet member having a generally cylindrical single tip portion and separate inlet and outlet passageways passing longitudinally through said outlet member, said tip portion being adapted for insertion into a single opening of the stopper, said outlet passageway being connected at the outer end thereof to the inner end of said conduit member, said inlet passageway having a check valve therein adapted to prevent outward flow therethrough.

ROBERT P. EVANS.

References Cited in the file of this patent

UNITED STATES PATENTS

| Number | Name | Date |
|---|---|---|
| 2,138,936 | Osterberg | Dec. 6, 1938 |
| 2,156,314 | Schwab | May 2, 1939 |
| 2,452,644 | Fields | Nov. 2, 1948 |
| 2,581,331 | Ryan et al. | Jan. 1, 1952 |